United States Patent [19]

Bulgrien et al.

[11] Patent Number: 5,337,624
[45] Date of Patent: Aug. 16, 1994

[54] POWERSHIFT TRANSMISSION WITH OVERLAPPING RANGES OF RATIOS

[75] Inventors: Garth H. Bulgrien, Ephrata; Charles A. Hansen, Lancaster, both of Pa.

[73] Assignee: Ford New Holland, Inc., New Holland, Pa.

[21] Appl. No.: 987,184

[22] Filed: Dec. 8, 1992

[51] Int. Cl.$^5$ ............................................. B60K 41/08
[52] U.S. Cl. ............................................. 74/335; 364/424.1
[58] Field of Search ........................ 74/335; 364/424.1

[56] References Cited

U.S. PATENT DOCUMENTS

| 4,576,065 | 3/1986 | Speranza et al. | 74/866 |
| 4,852,006 | 7/1989 | Speranza | 364/424.1 |
| 4,916,979 | 4/1990 | Irwin | 74/866 |
| 4,947,331 | 8/1990 | Speranza | 364/424.1 |
| 5,012,690 | 5/1991 | Bulgrien | 74/335 |

Primary Examiner—Leslie A. Braun
Assistant Examiner—Khoi Ta
Attorney, Agent, or Firm—Griffin Butler Whisenhunt & Kurtossy

[57] ABSTRACT

A powershift transmission having input, center and output clutch sections, each section including a plurality of clutches, is arranged to have a high and a low range of input/output speed ratios with some of the lower ratios of the high range being substantially equal to some of the higher ratios of the low range. During upshifting the shift sequence is 1L, 2L, ... (N−2)L, (N−1)L, NL, 3H, 4H, ... NH and during downshifting the sequence is NH, (N−1)H ... 2H, 1H, (N−2)L ... 2L, 1L wherein ratios (N−1)L and NL are substantially equal to 1H and 2H, respectively, L represents the low range, H represents the high range and N represents the number of gear ratios within each range. The arrangement avoids the need for simultaneous clutch swaps in all three clutch sections and reduces the number of shifts requiring simultaneous clutch swaps in the center and output clutch sections. This reduces the load placed on an engine during shifting because of the inertia of moving parts in the transmission, thereby providing smoother shifting particularly under heavy load conditions.

12 Claims, 3 Drawing Sheets

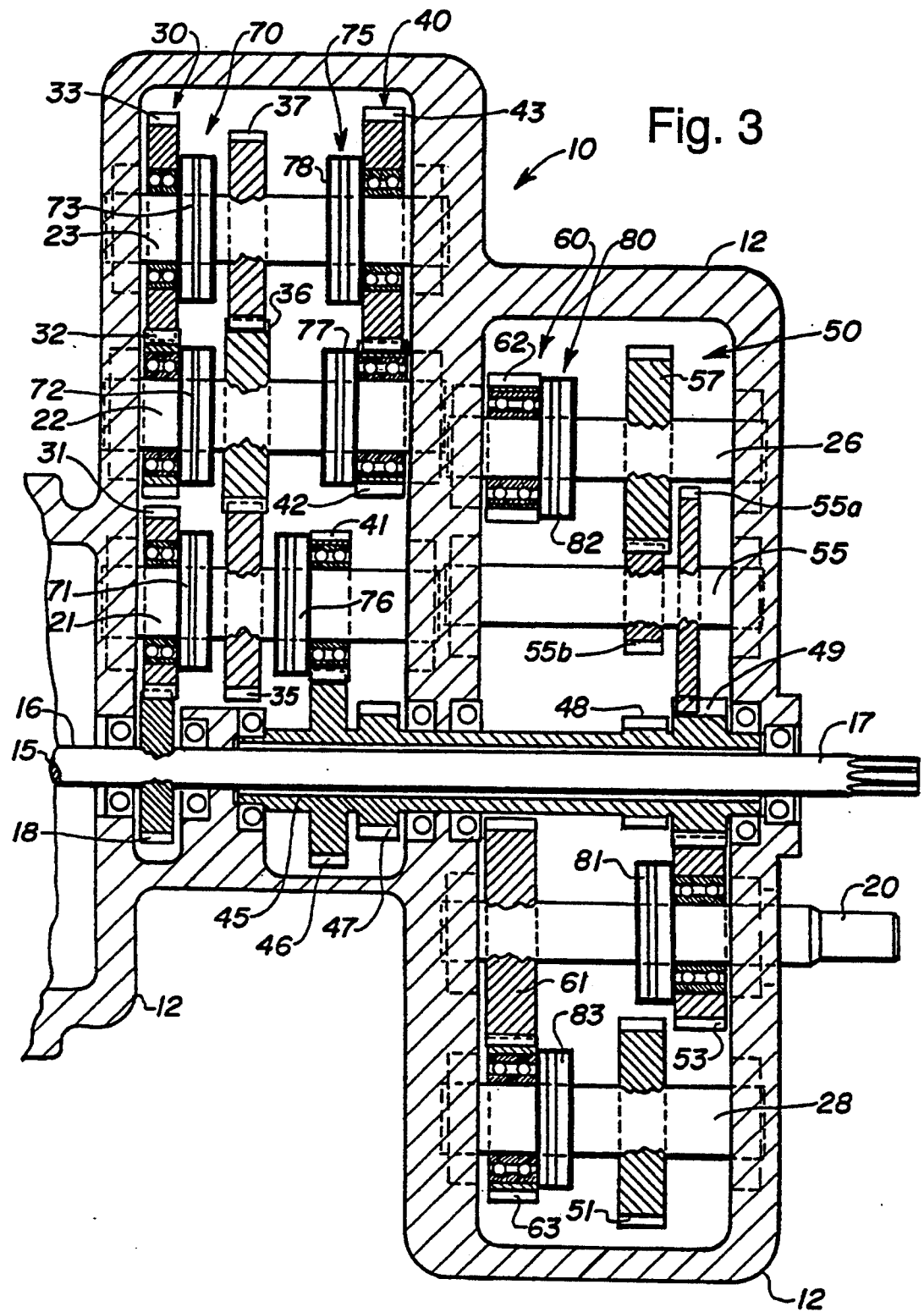

POWERSHIFT TRANSMISSION WITH OVERLAPPING RANGES OF RATIOS

RELATED APPLICATIONS

This application is related to application Ser. No. 07/501,573 filed Mar. 29, 1990, now U.S. Pat. No. 5,012,690, the disclosure of which is incorporated herein by reference.

FIELD OF THE INVENTION

The present invention relates to powershift transmissions having large numbers of powershift gear ratios, and more particularly to a method and apparatus for providing smoother shifts when plural simultaneous clutch changes are required.

BACKGROUND OF THE INVENTION

My U.S. Pat. No. 5,012,690 discloses a powershift transmission for a tractor, the transmission having 18 forward and 9 reverse gear ratios. The transmission has a 3-ratio input clutch section, a 3-ratio center clutch section and a 2-forward, 1-reverse ratio output clutch section. The combination of 3×3×2 gives 18 forward ratios. However, the arrangement requires multiple clutch swaps to accomplish certain shifts and this in turn requires that internal transmission components must change speed considerably. In the 18×9 transmission described in the aforementioned patent, the 10th forward ratio is achieved by engaging the slowest ratio in both the input and center clutch sections and engaging the fast forward ratio in the output clutch section To shift from the 10th to 9th ratio, both the input and center sections must shift to their fastest ratios while the output section shifts to the slow forward ratio. To complete this shift, 3 clutches must engage, 3 other clutches must disengage, and many gears, shafts and clutches in the transmission must speed up thereby absorbing considerable energy. Driving torque through the transmission cannot be maintained throughout the shift thus resulting in a shift that is not as smooth as other gear shifts if the tractor is under load.

The present invention is based on the observation that during most heavy load operations most of the shifting takes place between two or three ratios. The transmission described in the above-referenced patent has the shift sequence 1L 2L 3L 4L 5L 6L 7L 8L 9L 1H 2H 3H 4H 5H 6H 7H 8H 9H where 9L and 1H correspond to the 9th and 10th forward ratios mentioned above. If the high range (H) of ratios is overlapped with the low range (L) to provide the arrangement 1L 2L 3L 4L 5L 6L 7L 8L 9L
                 1H 2H 3H 4H 5H 6H 7H 8H 9H with the ratio 8L being substantially equal to ratio 1H and ratio 9L being substantially equal to 2H, the number of range shifts may be materially reduced by adopting the shift sequences

| Upshift | ... 7L 8L 9L 3H ... |
|---|---|
| Downshift | ... 3H 2H 1H 7L ... |

SUMMARY OF THE INVENTION

An object of the present invention is to provide an improved powershift transmission and method of operating such a transmission so as to reduce the number of range shifts occurring during use of the transmission.

Another object of the present invention is to provide a powershift transmission characterized in that it has a high range and a low range of gear ratios, the ranges overlapping.

A further object of the present invention is to provide a powershift transmission having a high range and a low range of gear ratios, at least some of the ratios in the low range being substantially equal to some of the ratios in the high range.

Still another object of the invention is to provide a method of shifting a powershift transmission of the type having high and low ranges of gear ratios with at least some of the higher ratios of the low range being substantially equal to respective ones of some of the lower ratios in the high range, the method comprising, during upshifting from the highest ratio in the low range, skipping the respective ratios in the high range that are substantially equal to ratios in the low range, during downshifting from the lowest ratio in the high range, skipping the respective ratios in the low range that are substantially equal to ratios in the high range, and during upshifting or downshifting within either of the ranges, selecting the next higher or lower ratio, respectively.

In accordance with the principles of the present invention a powershift transmission includes an input shaft, and output shaft, a plurality of gears and a plurality of clutches for selectively connecting the input shaft in driving relationship with the output shaft through various combinations of gears and clutches. The transmission has a high (H) and a low (L) range of gear speed ratios each range including N ratios 1L, 2L ... (N−2)L, (N−1)L,NL, and 1H, 2H, 3H ... NH. Some, preferably two, of the highest ratios in the low range, i.e. ratios (N−1)L and NL are substantially equal to respective ones of the lowest ratios in the high range, i.e. 1H and 2H. During upshifting the ratios are selected in the sequence ... (N−2)L,(N−1)L,NL, 3H ... and during downshifting the ratios are selected in the sequence ... 3H,2H,1H,(N−2)L ... The arrangement permits shifting between ratios heretofore associated with different ranges without requiring multiple simultaneous clutch swaps. The arrangement does not completely eliminate the requirement for multiple simultaneous clutch swaps but it does significantly reduce the number of such swaps in practical applications.

Other features and advantages of the invention and its mode of operation will become apparent upon consideration of the following description and the accompanying drawings.

DETAILED DESCRIPTION OF THE INVENTION

Figure 1:
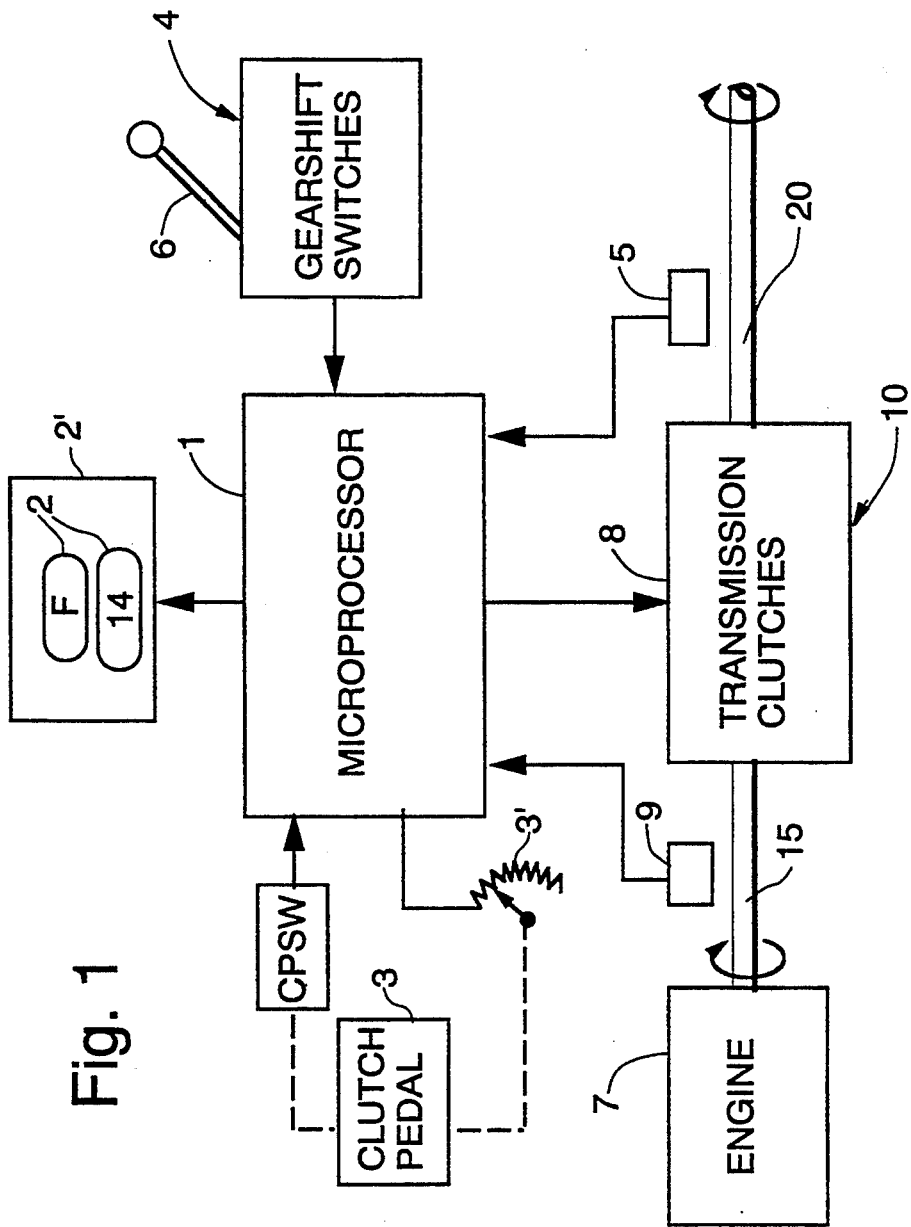
FIG. 1 illustrates a powershift transmission control system in which the present invention is embodied.

As shown in FIG. 1, a powershift transmission control system includes a microprocessor 1, a display 2 on an operator's control panel 2', a plurality of gearshift switches 4 which are selectively actuated by manually moving a gearshift lever 6, and a plurality of transmission clutches 8 associated with a transmission 10 which transmit power from a rotating power input shaft 15 to a power output or vehicle drive shaft 20. An engine 7 unidirectionally rotates shaft 15 and a sensor 9 senses rotation of shaft 15 to provide output signals representing engine speed. An operator-actuated clutch pedal 3 controls a potentiometer 3' and the output signal from the potentiometer is applied to microprocessor 1 to develop modulating signals which are applied to a final set of clutches in transmission 10. The clutch pedal 3 also actuates a clutch pedal switch CPSW when the pedal is depressed to its limit of travel. The control system is admirably suited for controlling the transmission of a tractor but it will be obvious that it may also be used to control the transmission of other vehicles or machines. Microprocessor 1 periodically samples the clutch pedal switch, the output of potentiometer 3', the switches 4, and the outputs of output and input shaft speed sensors 5 and 9, and in response to the sensed conditions controls transmission clutches 8 to "select gears", i.e. select the direction and rate of rotation of output shaft 20 relative to input shaft 15.

The transmission control system of FIG. 1 is similar to that disclosed in my aforementioned patent and reference may be made thereto for a more detailed explanation of the system operation. The system of FIG. 1 differs from that disclosed in the patent in that (1) the program executed by microprocessor 1 to control shifting is modified and (2) gear ratios within the transmission 10 (shown in FIG. 3) have been modified.

FIG. 3 is a schematic planar development of a power-shift transmission having 18 forward gear ratios and 9 reverse gear ratios. The transmission is housed in a casing 12 and has a drive shaft 15 with a power input end 16 adapted to be driven by engine 7. The output end 17 of drive shaft 15 serves as a power take-off. An output shaft 20 drives the tractor wheels or other load in a conventional manner.

The transmission 10 has an input clutch section comprising a set 30 of three gears 31, 32, 33 and a set 70 of three clutches 71, 72, 73, a center clutch section comprising a set 40 of three gears 41, 42, 43 and a set 75 of three clutches 76, 77, 78, and an output clutch section comprising a set 60 of two forward gears 53, 62, a set 80 of two forward clutches 81, 82, a reverse gear 63 and a reverse clutch 83.

A drive pinion 18 is rigidly secured to drive shaft 15 and when shaft 15 is rotated pinion 18 drives the gears 31, 32 and 33 which have different numbers of teeth and are mounted for free rotation on shafts 21, 22 and 23, respectively. Electro-hydraulic clutches 71, 72 and 73 are affixed to shafts 21, 22 and 23, respectively, and when one of these clutches is energized it couples drive power from one of the gears 31, 32 or 33 to one of the shafts 21, 22 or 23. The shafts 21, 22 and 23 are coupled together by gears 35, 36 and 37 which are all the same size so that all three shafts are driven at the same speed ratio relative to drive shaft 15, this ratio being determined by which one of the clutches 71, 72 or 73 is energized.

Gears 41, 42 and 43 are differently sized and are mounted for free rotation on shafts 21, 22 and 23, respectively. Clutches 76, 77 and 78 are affixed to shafts 21, 22 and 23, respectively, and may be selectively energized to drive one of the gears 41, 42 or 43 at the speed of the shafts 21, 22 and 23. Gear 42 engages gear 43 which in turn engages a transfer gear 47 fixed on a transfer hub assembly 45. Gear 41 engages a transfer gear 46 fixed on the transfer hub assembly. Therefore, if any one of the gears 41 42 or 43 is driven, all of the gears and the transfer hub assembly 45 are driven.

Since gears 41, 42 and 43 are differently sized, the transfer hub assembly 45 may be driven at one of three speed ratios relative to the shafts 21, 22 and 23. Furthermore, since shafts 21, 22 and 23 may be driven at one of three speed ratios relative to drive shaft 15, because of the differently sized gears 31, 32 and 33, it is clear that the transfer hub assembly 45 may be driven at one of nine speed ratios relative to the drive shaft, the ratio depending on which one of the input section clutches 71, 72 or 73 and which one of the center section clutches 76, 77 or 78 is energized.

The transfer hub assembly 45 is mounted in the casing 12 for free rotation concentric with drive shaft 15 and serves to transfer drive power to the output section. A transfer gear 49, affixed to the transfer hub assembly 45, engages a gear 53 which is mounted for free rotation on output shaft 20. A high speed final clutch 81 is affixed to shaft 20 and when clutch 81 is energized to drive gear 51 the shaft is driven at one of nine forward speed ratios, designated 1H, 2H ... 9H, within a high range H.

The transfer gear 49 also drives a gear 55a which, with a gear 55b, is attached to a shaft 55. Gear 55b drives a gear 57 which is affixed to a shaft 26. A low speed final clutch 82 is affixed to shaft 26 while a gear 62 is mounted for free rotation on the shaft. When clutch 82 is energized to drive gear 62, gear 62 drives gear 61 which is affixed to the output shaft 20. When the low speed final clutch 82 is engaged, the output shaft 20 is driven at one of nine forward speed ratios, designated 1L, 2L ... 9L within a low range L.

As explained in greater detail in U.S. Pat. No. 5,012,690, the output shaft 20 may be driven at one of 18 forward speed ratios relative to input shaft 15 by simultaneously energizing one electro-hydraulic clutch in each of the clutch sets 70, 75 and 80. Table I shows, for each of these ratios, the selected "gear" and the clutches which are energized. An operator may initiate an upshift by moving the gearshift lever 6 to a forward upshift position. The microprocessor periodically senses gearshift switches 4 and, if the lever 6 is in the forward upshift position the microprocessor outputs signals to the clutches in the transmission 10 to select the next highest gear. This continues as long as the lever position is not changed or until the highest gear (9H) is reached. Thus, if the transmission is in the lowest gear (1L) it is successively shifted through all gears until the highest gear 9H is reached.

In like manner, a downshift is accomplished by moving the gearshift lever 6 to a forward downshift position. Assuming the transmission is in the highest gear (9H) it is successively shifted through all gears until the lowest gear 1L is reached or until the shift lever 6 is moved out of the forward downshift position.

TABLE I

| GEAR | ENERGIZED CLUTCHES | | | INPUT/OUTPUT RATIO |
| --- | --- | --- | --- | --- |
| | SET 70 | SET 75 | SET 80 | |
| 1L | 73 | 76 | 82 | 12.5955 |
| 2L | 71 | 76 | 82 | 10.6577 |
| 3L | 72 | 76 | 82 | 9.10749 |
| 4L | 73 | 77 | 82 | 7.95062 |
| 5L | 71 | 77 | 82 | 6.72745 |
| 6L | 72 | 77 | 82 | 5.74891 |

TABLE I-continued

| GEAR | ENERGIZED CLUTCHES | | | INPUT/OUTPUT RATIO |
|---|---|---|---|---|
| | SET 70 | SET 75 | SET 80 | |
| 7L | 73 | 78 | 82 | 4.88395 |
| 8L | 71 | 78 | 82 | 4.13258 |
| 9L | 72 | 78 | 82 | 3.53147 |
| 1H | 73 | 76 | 81 | 3.03333 |
| 2H | 71 | 76 | 81 | 2.56667 |
| 3H | 72 | 76 | 81 | 2.19333 |
| 4H | 73 | 77 | 81 | 1.91473 |
| 5H | 71 | 77 | 81 | 1.62016 |
| 6H | 72 | 77 | 81 | 1.38450 |
| 7H | 73 | 78 | 81 | 1.17619 |
| 8H | 71 | 78 | 81 | 0.99524 |
| 9H | 72 | 78 | 81 | 0.85048 |

From Table I it is seen that a downshift from the 10th gear ratio (1H) to the 9th ratio (9L) requires three clutch swaps: in clutch set 70 clutch 73 is deenergized and clutch 72 energized; in set 75 clutch 76 is deenergized and clutch 78 energized; in clutch set 80 clutch 81 is deenergized and clutch 82 is energized. Many clutches, shafts and gears must thus be speeded up and this absorbs energy so that driving torque through the transmission cannot be maintained during the shift. The result is a shift quality which is less than other shifts under similar operating conditions.

In most heavy load applications, the tractor is generally operated in a range of two or three gears. If this range should include gears 9L and 1H an operator will experience a range shift each time a shift is made between these gears. In accordance with the principles of the present invention, the number of range shifts is reduced by modifying the prior art transmission as indicated in Table II.

neous clutch swaps in the center clutch section 75 and the output clutch section 80. In this regard, the load effect of the inertia of the clutches, gears and shafts in the transmission is greatest when swapping clutches in the output clutch set 80, is less when swapping clutches in the center clutch set 75 and least when swapping clutches in the input clutch set 70 only.

From Table II it is evident that when operating in the low gear range, shifting may take place up to gear 9L, the equivalent of gear 2H in Table I without simultaneous swaps of clutches in the clutch sets 75 and 80. It is also evident that when operating in the high gear range shifting may take place down to gear 1H, the equivalent of gear 8L in Table II without simultaneous swapping of clutches in clutch sets 75 and 80.

It is also evident from Table II that the present invention does not eliminate all simultaneous swaps of clutches in the center clutch set 75 and the output clutch set 80. Such simultaneous swaps will still occur if operating in the high range and a downshift is made from gear 1H to gear 7L, or if operating in the low range and an upshift is made from gear 9L to gear 3H. However, since most heavy load operations require shifting between only two or three ratios, the system will automatically seek the proper range (7L–9L or 1H–3H), requiring at most only one simultaneous swapping of clutches in clutch sets 75 and 80 to get there. All subsequent shifts during that operation can then be smooth, as long as the transmission is not upshifted from 9L to 3H or downshifted from 1H to 7L.

Figure 2:
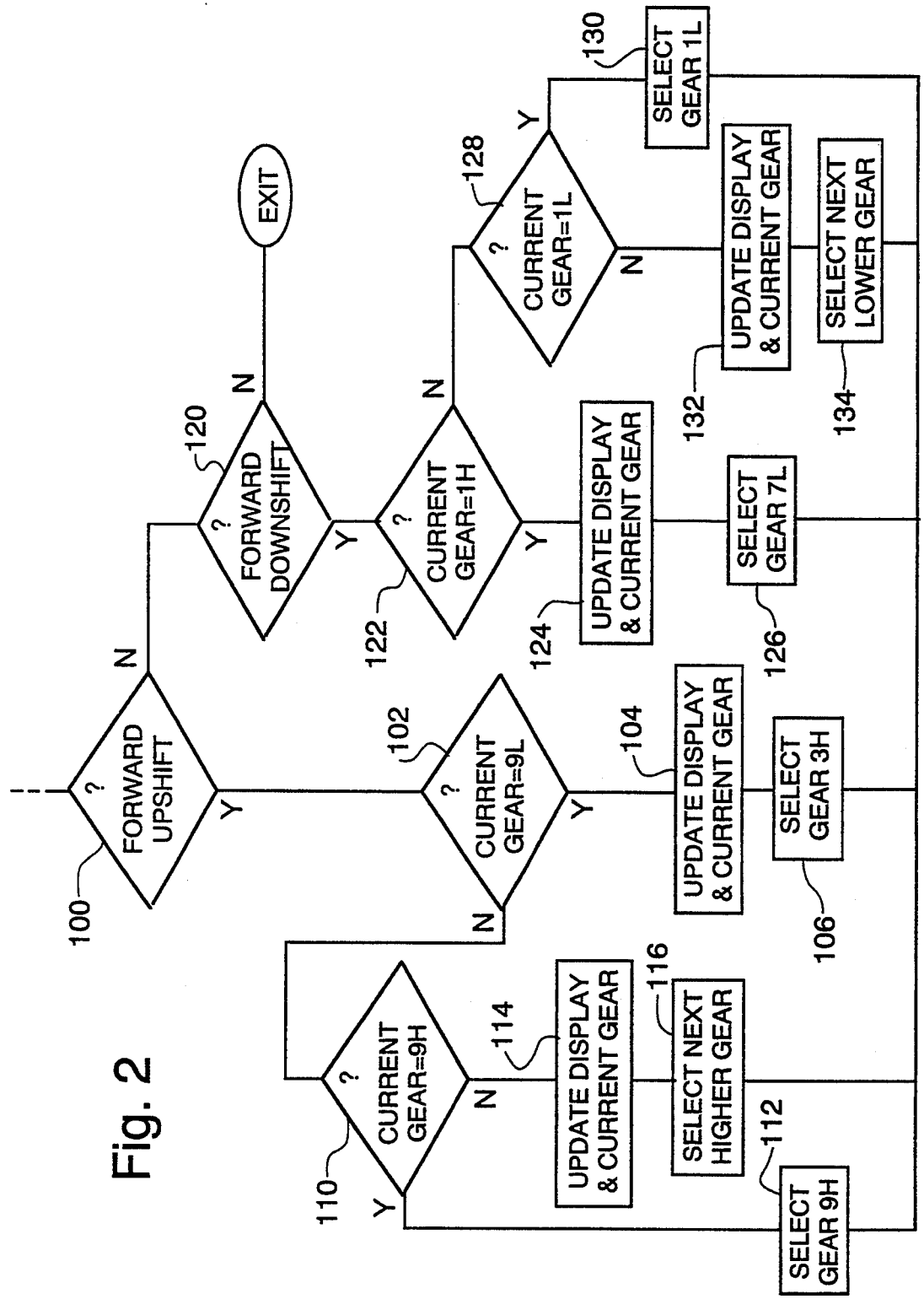
FIG. 2 is a flow diagram illustrating a sequence of steps executed by the microprocessor of FIG. 1 to accomplish shifting between ratios; and, FIG. 3 is a schematic planar development of a powershift transmission having 18 forward speeds and 9 reverse speeds.

FIG. 2 is a flow diagram illustrating that portion of a program executed by microprocessor 1 to control shifting in accordance with the sequence set forth in Table II. As previously stated, the microprocessor repeatedly

TABLE II

| GEAR | CLUTCHES ENERGIZED | | | INPUT/OUTPUT RATIO |
|---|---|---|---|---|
| | SET 70 | SET 75 | SET 80 | |
| 1L | 73 | 76 | 82 | 9.14483 |
| 2L | 71 | 76 | 82 | 7.73793 |
| 3L | 72 | 76 | 82 | 6.61241 |
| 4L | 73 | 77 | 82 | 5.77248 |
| 5L | 71 | 77 | 82 | 4.88441 |
| 6L | 72 | 77 | 82 | 4.17395 |
| 7L | 73 | 78 | 82 | 3.54595 |
| 8L↓  ↑1H | 71↓  ↑73 | 78↓  ↑76 | 82↓  ↑81 | 3.00042(L) or 3.03333(H) |
| 9L↓  ↑2H | 72↓  ↑71 | 78↓  ↑76 | 82↓  ↑81 | 2.56400(L) or 2.56667(H) |
| 3H | 72 | 76 | 81 | 2.19333 |
| 4H | 73 | 77 | 81 | 1.91473 |
| 5H | 71 | 77 | 81 | 1.62016 |
| 6H | 72 | 77 | 81 | 1.38450 |
| 7H | 73 | 78 | 81 | 1.17619 |
| 8H | 71 | 78 | 81 | 0.99524 |
| 9H | 72 | 78 | 81 | 0.85048 |

From Table II it is seen that the input/output ratio for gear 8L is made substantially equal to the ratio for gear 1H and the ratio for gear 9L is made substantially equal to the ratio for gear 2H. This is most easily accomplished by changing the size of the low range gear 82 in the output clutch set 80. In addition, the shift control routine executed by microprocessor 10 is modified as subsequently described so that on upshifting the sequence is 1L, 2L, . . . 7L, 8L, 9L, 3H, 4H, . . . 9H and on downshifting the sequence is 9H, 8H, . . . 2H, 1H, 7L, 6L, . . . 1L. That is, on upshifting from the low range to the high range the gears 1H and 2H are skipped and on downshifting from the high range to the low range gears 9L and 8L are skipped. This eliminates the only shifts requiring simultaneous clutch swaps in all three clutch sections. Furthermore it eliminates some simultasamples the gearshift switches 4, the output of clutch pedal potentiometer 3' and the clutch pedal switch CPSW. Values representing the states of the switches and the position of the potentiometer are stored in memory registers within the microprocessor and used to control the clutches in transmission 10 during execution of the microprocessor program. At step 100, the stored value representing the last sensed condition of the gearshift switches 4, (representing the position of gearshift lever 6), is tested to see if the gearshift lever is in the forward upshift position. If the test proves true then at step 102 a register CG is tested. Register CG stores the current gear value, that is, the gear from which the transmission is being shifted.

The test at step 102 determines if the current gear is 9L. If it is, the display 2 and the register CG are updated at step 104 to indicate gear 3H and at step 106 the clutches are set to select gear 3H. This completes the gear shift routine as it relates to the present invention.

If the test at step 102 shows that the current gear is not 9L, then at step 110 register CG is tested to see if the current gear is 9H. If the current gear is 9H then further upshifting is not possible. The clutches are set at step 112 to select gear 9H.

If the test at step 110 shows that the current gear is not 9H then the display 2 and value in register CG are updated at step 114 to represent the next higher gear. At step 116 the clutches are set to select the next higher gear.

Assume now that the operator moves gearshift lever 6 to the forward downshift position. In this case the test at step 100 proves false and the program branches to step 120. Since the gearshift lever is in the forward downshift position the test at step 120 proves true and the program advances to step 122 where the value in CG is tested to see if the current gear is 1H. If it is, the display 2 and the value in register CG are updated at step 124 to indicate gear 7L and at step 126 the clutches are set to select gear 7L.

If the test at step 122 shows that the current gear is not 1H then CG is tested at step 128 to see if the current gear is 1L. If it is, further downshifting is not possible. At step 130 the processor sets the clutches so that gear 1L continues to be selected.

When the test at step 128 shows that the current gear is not 1L, the display 2 and register CG are updated at step 132 to indicate the next lower gear. At step 134 the microprocessor sets the clutches to select the next lower gear.

From the foregoing description it is seen that the present invention provides a method and apparatus for reducing the number of range shifts in a powershift transmission. This improved shifting performance is obtained at the expense of a reduction in the overall range of input/output ratios but requires only one gear change and minor modification in the microprocessor program. While the invention has been described by reference to a powershift transmission having three clutch sections and 18 forward gear speeds, it is equally applicable to powershift transmissions having a different number of clutch sections or a different number of forward gear speeds. Also, it is not necessary that the number of overlapping gear ratios be two. For the general case of a transmission having high (H) and low (L) ranges of gear ratios, each range having N ratios, the upshift sequence may be 1L, 2L, . . . NL,(k+1)H, (k+2)H, . . . NH and the downshift sequence may be NH, (N−1)H, . . . 1H, (N−k)L, (N−k−1)L . . . 1L where k is the number of ratios in one range which are substantially equal to respective ratios in the other range. Modifications falling within the spirit and scope of the invention will be obvious to those skilled in the art and it is intended to be limited only by the scope of the appended claims.

We claim:

1. A powershift transmission having a rotatable input shaft, a rotatable output shaft, a plurality of clutch sections each including a plurality of clutches and gears, said clutches being energizable to selectively contact said input shaft in driving relationship with said output shaft at one of a plurality of gear ratios, said plurality of clutches of one of said clutch sections including first and second clutches which, when energized, limit the gear ratio to a lower or a higher range, respectively, said transmission being characterized in that said lower and higher ranges of ratios overlap with the two lowest gear ratios in said higher range being substantially equal to the two highest gear ratios of said lower range.

2. A powershift transmission as claimed in claim 1 wherein said plurality of clutch sections comprises three clutch sections.

3. A powershift transmission as claimed in claim 1 wherein said plurality of clutch sections comprises three clutch sections, said one clutch section having only two clutches and two of said clutch sections having three clutches.

4. A powershift transmission as claimed in claim 1 and further comprising shift control means for selectively energizing said plurality of clutches in sequential combinations to upshift or downshift from one of said gear ratios to another, said shift control means energizing said clutches in sequences which skip said two highest gear ratios in said lower range when downshifting from the lowest gear ratio in said higher range and skip said two lowest gear ratios in said higher range when upshifting from the highest gear ratio in said lower range.

5. A powershift transmission comprising an input shaft, an output shaft, a plurality of gears and a plurality of clutch sections for selectively coupling said gears in driving relationship with said shafts at one of a plurality of forward gear ratios, a first of said plurality of clutch sections including a first clutch for selecting a low range (L) of gear ratios 1L, 2L, . . . (N−2)L,(N−1)L, NL and a second clutch for selecting a high range (H) of gear ratios 1H, 2H, 3H . . . (N−1)H,NH, N being the number of gear ratios in said high range of gear ratios and in said low range of gear ratios, said transmission being characterized in that a plurality of gear ratios in said low range of gear ratios are approximately equal to gear ratios in said high range of gear ratios.

6. A powershift transmission as claimed in claim 5 wherein said plurality of clutch sections comprises at least three clutch sections, a second of said clutch sections having a first number of clutches and a third of said clutch sections having a second number of clutches where the product of said first and second numbers of clutches is equal to the number of gear ratios in said low range of gear ratios and in said high range of gear ratios.

7. A power shift transmission as claimed in claim 6 and further comprising means for simultaneously actuating one clutch in each of said sections to thereby select one of said ranges and a gear ratio within the selected range.

8. A powershift transmission having a rotatable input shaft, a rotatable output shaft, a plurality of gears, a plurality of clutches for selectively connecting said input shaft in driving relationship with said output shaft at one of a plurality of gear ratios, said plurality of gear ratios comprising a low range (L) of gear ratios 1L, 2L, . . . (N−2)L,(N−1)L, NL and a high range (H) of gear ratios 1H, 2H, 3H, . . . (N−1)N, NH, N being the number of gear ratios in said low range of gear ratios and in said high range of gear ratios and shift sequencing means for successively energizing said clutches in various combinations to upshift or downshift from one of said gear ratios to another, said shift sequencing means including means for next selecting gear ratio 3H input an upshift from gear ratio NL and means for next selecting gear ratio (N−2)L upon a downshift from gear ratio 1H.

9. A powershift transmission as claimed in claim 8 wherein the gear ratios (N−1)L and NL are substantially equal to the gear ratios 1H and 2H, respectively.

10. A method of shifting a powershift transmission having a rotatable input shaft, a rotatable output shaft, a plurality of gears, a plurality of clutches for selectively connecting said input shaft in driving relationship with said output shaft at one of a plurality of gear ratios comprising a low range (L) of gear ratios 1L, 2L, . . . NL and a high range (H) of gear ratios 1H, 2H, . . . NH, at least two of the gear ratios at an upper end of said low range of gear ratios being substantially equal to respective ones of the gear ratios at a lower end of said high range of gear ratios, said method comprising the steps of: during upshifting, skipping said respective ones of the gear ratios at the lower end of said high range of gear ratios when said upshifting is from the highest gear ratio NL of said low range of gear ratios and during downshifting, skipping the gear ratios of said low range of gear ratios which are substantially equal to gear ratios in said high range of gear ratios when said downshifting is from the lowest gear ratio 1H of said high range of gear ratios, and during upshifting or downshifting within either of said ranges, selecting the next higher or lower gear ratio, respectively.

11. The method as claimed in claim 10 wherein the number of gear ratios in said low range of gear ratios that are substantially equal to gear ratios in said high range of gear ratios is k whereby gear ratios are selected in the sequence 1L, 2L, . . . NL, (k+1)H . . . NH during upshifting and in the sequence NH, (N−1)H, . . . 1H, (N−k)L, (N−k−1)L, . . . 1L during downshifting.

12. A powershift transmission as claimed in claim 5 wherein the gear ratios (N−1)L and NL are approximately equal to the gear ratios 1H and 2H, respectively.

* * * * *